US012638169B2

(12) United States Patent
Yu

(10) Patent No.: US 12,638,169 B2
(45) Date of Patent: May 26, 2026

(54) ILLUMINATING APPARATUS

(71) Applicant: NINGBO WELL ELECTRIC APPLIANCE CO., LTD., Ningbo (CN)

(72) Inventor: Guolin Yu, Ningbo (CN)

(73) Assignee: NINGBO WELL ELECTRIC APPLIANCE CO., LTD., Ningbo (CN)

( * ) Notice: Subject to any disclaimer, the term of this patent is extended or adjusted under 35 U.S.C. 154(b) by 0 days.

(21) Appl. No.: 18/920,899

(22) Filed: Oct. 20, 2024

(65) Prior Publication Data

US 2026/0043539 A1 Feb. 12, 2026

(30) Foreign Application Priority Data

Aug. 9, 2024 (CN) ......................... 202421930168.8

(51) Int. Cl.

| | |
|---|---|
| ***F21V 31/00*** | (2006.01) |
| ***F21S 6/00*** | (2006.01) |
| ***F21V 15/01*** | (2006.01) |
| ***F21V 17/12*** | (2006.01) |
| ***F21V 23/04*** | (2006.01) |

(52) U.S. Cl.

CPC ............ *F21V 31/005* (2013.01); *F21S 6/005* (2013.01); *F21V 15/01* (2013.01); *F21V 17/12* (2013.01); *F21V 23/04* (2013.01)

(58) Field of Classification Search

CPC ........ F21V 31/005; F21V 15/01; F21V 17/12; F21V 23/04; F21S 6/005

See application file for complete search history.

(56) References Cited

U.S. PATENT DOCUMENTS

| | | | | |
|---|---|---|---|---|
| 9,188,292 | B2 * | 11/2015 | Armer | F21V 23/0414 |
| 10,042,237 | B1 * | 8/2018 | Zhang | G03B 21/20 |
| 2017/0082254 | A1 * | 3/2017 | Zhang | A63H 27/10 |
| 2017/0159924 | A1 * | 6/2017 | Khubani | F21V 29/70 |
| 2021/0404617 | A1 * | 12/2021 | Zheng | F21V 21/30 |

* cited by examiner

*Primary Examiner* — Tsion Tumebo

(57) ABSTRACT

An illuminating apparatus is provided. The illuminating apparatus includes a housing, a lighting panel, a control plate, a button, a waterproof pressing plate and a support, the lighting panel has a plurality of lighting modes, the lighting panel can emit light in each of the plurality of lighting modes which passes through the housing. The control plate is electrically connected to the lighting panel. The button can allow a user to press, trigger the control plate to switch and control the plurality of lighting modes of the lighting panel. The waterproof pressing plate is fixedly mounted inside the housing and abuts against the button, and the waterproof pressing plate is configured to press and limit the button on the housing, so that the button and the housing are sealingly assembled. The support is connected to the housing and configured to carry the housing.

9 Claims, 2 Drawing Sheets

ILLUMINATING APPARATUS

CROSS-REFERENCE TO RELATED APPLICATION

This application claims priority to Chinese patent application No. 202421930168.8, filed on Aug. 9, 2024, and titled "GROUND-MOUNTING LAMP". The content of the above identified application is hereby incorporated herein in its entirety by reference.

TECHNICAL FIELD

The present disclosure relates to the field of illuminating technology, and in particular, to an illuminating apparatus.

BACKGROUND

An illuminating apparatus can be used as an outdoor landscape light. The illuminating apparatus can be mounted on the ground by a support, and the illuminating apparatus can be widely applied to outdoor scenes such as lawns, yards and so on.

In related technology, the illuminating apparatus merely has one lighting mode, which cannot satisfy a requirement for different lighting modes of the illuminating apparatus.

SUMMARY

According to various embodiments of the present disclosure, an illuminating apparatus is provided.

The illuminating apparatus includes a housing, a lighting panel, a control plate, a button, a waterproof pressing plate, and a support. The lighting panel is fixedly mounted inside the housing. The lighting panel has a plurality of lighting modes, and the lighting panel is capable of emitting light in each of the plurality of lighting modes which passes through the housing. The control plate is fixedly mounted inside the housing and electrically connected to the lighting panel. The button penetrates through the housing. The button is configured for allowing a user to press, triggering the control plate to switch and control the plurality of lighting modes of the lighting panel. The waterproof pressing plate is fixedly mounted inside the housing and abuts against the button. The waterproof pressing plate is configured to press and limit the button on the housing, so that the button and the housing are sealingly assembled. The support is connected to the housing and configured to carry the housing.

By the above structures, the user can press the button to control the lighting panel to switch to different lighting modes, which can satisfy a requirement of the user for the different lighting modes of the lighting panel. During this process, the button and the housing are sealingly assembled by the waterproof pressing plate, such that an arrangement of the button will not affect a waterproof performance of the overall illuminating apparatus, thereby satisfying a requirement for outdoor use.

In one embodiment, the button is configured as a flexibly component. The control plate is electrically connected to a triggering rod, the triggering rod penetrates through the waterproof pressing plate and extends into the button, and the button is capable of triggering the triggering rod after being pressed and deformed.

In one embodiment, the illuminating apparatus further includes a plurality of fixing components. The plurality of fixing components are capable of penetrating through the waterproof pressing plate and being threadedly connected to the housing.

By arranging above structures, it is conducive to assembling the waterproof pressing plate into the housing.

In one embodiment, the waterproof pressing plate is provided with a plurality of connecting lugs, and the housing is provided a plurality of convex columns. The plurality of connecting lugs, the plurality of convex columns and the plurality of fixing components correspond to each other one by one. The plurality of fixing components are capable of correspondingly penetrating through the plurality of connecting lugs and being threadedly connected to the plurality of convex columns. The plurality of connecting lugs are disposed on a periphery of the button.

By arranging the above structures, a connection between the waterproof pressing plate and the housing will not affect the button being pressed and restricted on the housing through the waterproof pressing plate, and a sealing performance between the button and the housing is ensured.

In one embodiment, the number of fixing components is at least three, three of at least three fixing components are arranged in a triangle shape.

By arranging the above structures, stability of the waterproof pressing plate assembling on the housing can be improved, and it can ensure that the button and the housing are sealingly assembled.

In one embodiment, a tricolor lamp bead is electrically connected to the lighting panel.

The lighting panel can emit lights by the tricolor lamp bead, such that the lighting panel can generate any color of light as required.

In one embodiment, the illuminating apparatus further includes a reflector. The tricolor lamp bead penetrates through the reflector, and the reflector is configured to reflect and guide light emitted from the tricolor lamp bead outside the housing.

The reflector is configured to guide the light from the tricolor lamp bead outside the housing, thereby improving a light output efficiency when the illuminating apparatus is operated.

In one embodiment, the housing includes a lower cover and an upper cover. The upper cover is fixedly connected to the lower cover, and a sealing ring is assembled between the upper cover and the lower cover. The lower cover is connected to the support.

In one embodiment, the upper cover includes an upper cover body and a transparent cover. The transparent cover is connected to the upper cover body and located on a light output path. The upper cover body encircles the transparent cover.

In one embodiment, the upper cover body and the transparent cover are an integral structure.

The upper cover body and the transparent cover are the integral structure, facilitating producing the upper cover, thereby ensuring a sealing performance between the upper cover body and the transparent cover.

Due to an application of above solution, the present disclosure has following advantages: as for the illuminating apparatus of the present disclosure, the user can press the button to control lighting panel to switch to different lighting modes, which can satisfy a requirement of the user for the different lighting modes of the lighting panel. During this process, the waterproof pressing plate is configured to seal the button on the housing, such that the arrangement of the button will not affect the waterproof performance of the overall illuminating apparatus, thereby satisfying a requirement for outdoor use.

BRIEF DESCRIPTION OF THE DRAWINGS

For a better description and illustration of embodiments and/or examples of those disclosures disclosed herein, reference may be made to one or more attached drawings. Additional details or examples used to describe the drawings should not be considered as limiting the scope of any of the disclosed disclosures, currently described embodiments and/or examples, and currently understood best modes of these disclosures.

Reference signs are as follows: 100 represents an illuminating apparatus; 10 represents a housing; 11 represents a lower cover; 111 represents an convex column; 12 represents an upper cover; 121 represents an upper cover body; 122 represents a transparent cover; 13 represents a sealing ring; 20 represents a lighting panel; 21 represents a tricolor lamp bead; 30 represents a control plate; 31 represents a triggering rod; 40 represents a button; 50 represents a waterproof pressing plate; 51 represents a connecting lug; 60 represents a support; 70 represents a reflector; 80 represents a light-sensitive module; 101 represents an adjustable screw; 102 represents a locking nut; and 103 represents a fixing component.

DETAILED DESCRIPTION

The following will provide a clear and complete description of the technical solution in the embodiments of the present disclosure, in communication with the accompanying drawings. Obviously, the described embodiments are only a part of the embodiments of the present disclosure, not all of them. Based on the embodiments in the present disclosure, all other embodiments obtained by ordinary skill in this art without creative labor fall within the scope of protection of the present disclosure.

It should be noted that, when a member is considered "connected to" another member, it can be directly fixed to another member or there may be a centered member present simultaneously. When a member is considered "set on" another member, it can be directly set on another member or there may be a centered member present simultaneously. When a member is considered "fixed to" another member, it can be directly fixed to another member or there may be a centered member present simultaneously.

Unless otherwise defined, all technical and scientific terms used in this article have the same meanings as those commonly understood by those skilled in the technical field of the present disclosure. The terms used in the specification of the present disclosure are only for the purpose of describing specific embodiments and are not intended to limit the present disclosure. The term "or/and" used in this article includes any and all combinations of one or more related listed items.

Figure 1:
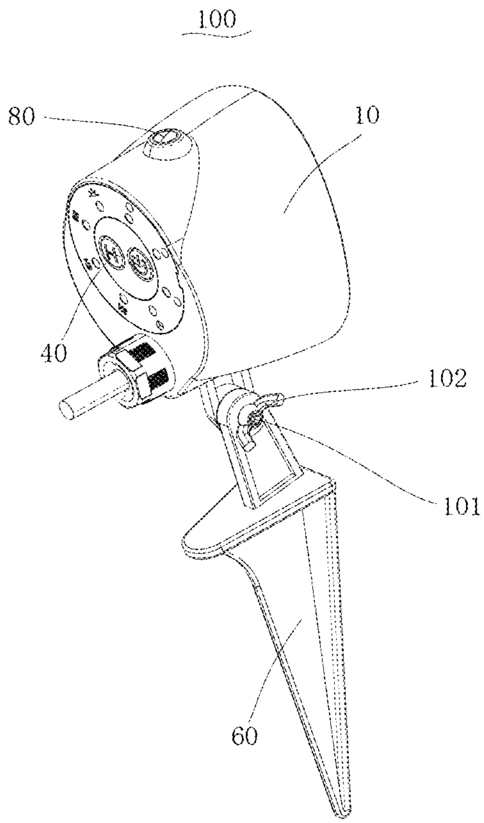
FIG. 1 is a schematic diagram of an illuminating apparatus in an embodiment of the present disclosure.
Figure 2:
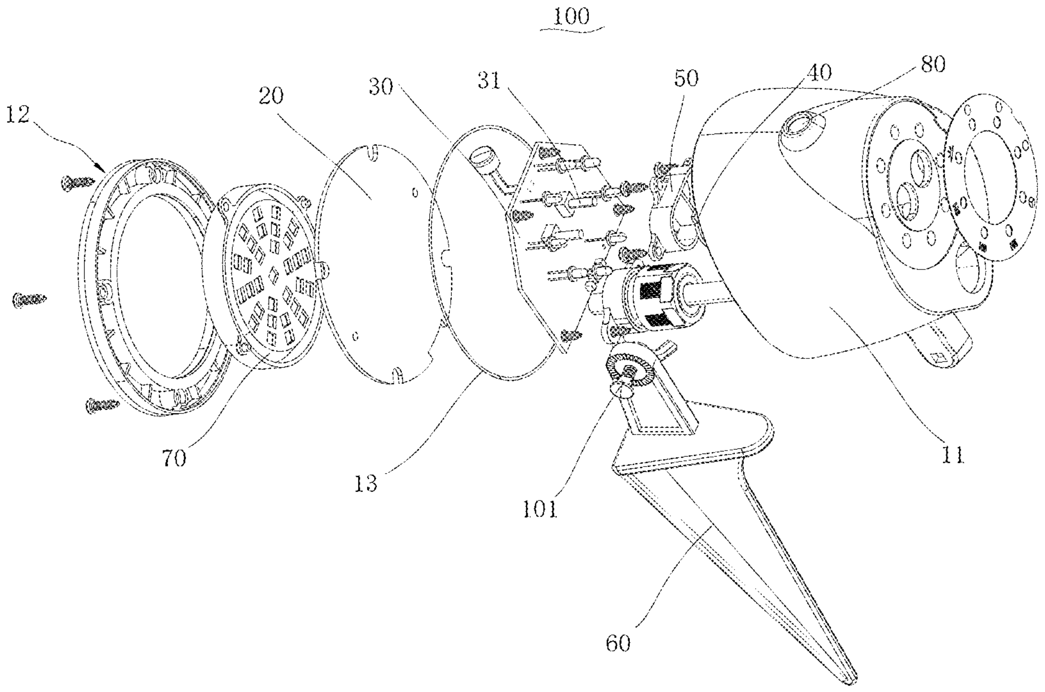
FIG. 2 is an exploded diagram of an illuminating apparatus in an embodiment of the present disclosure.
Figure 4:
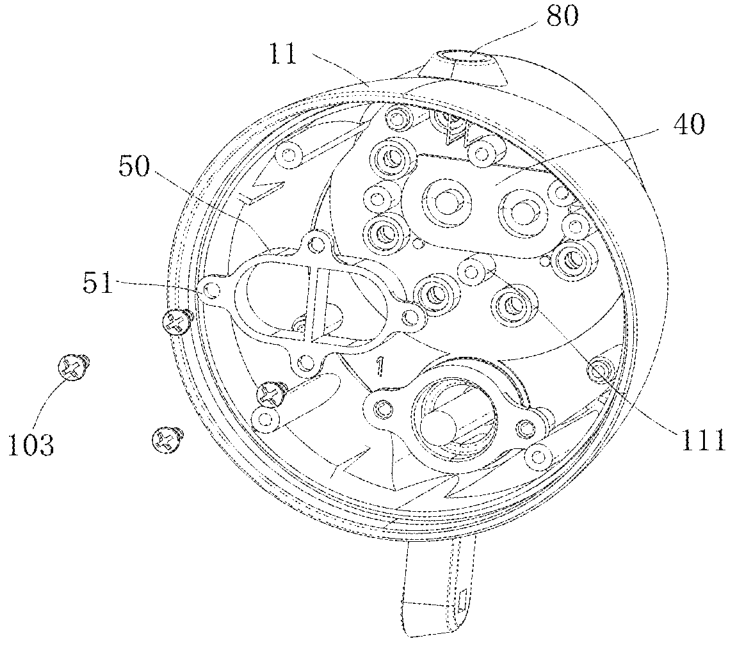
FIG. 4 is an exploded diagram of a lower cover, an button and a waterproof pressing plate in the present disclosure.

Referring to FIGS. 1, 2 and 4, an illuminating apparatus 100 is provided by one embodiment of the present disclosure. The illuminating apparatus 100 includes a housing 10, a lighting panel 20, a control plate 30, a button 40, a waterproof pressing plate 50, and a support 60. The lighting panel 20 is fixedly mounted inside the housing 10. The lighting panel 20 has a plurality of lighting modes. The light panel 20 is capable of emitting light in each of the plurality of lighting modes which passes through the housing. The control plate 30 is fixedly mounted inside the housing 10 and electrically connected to the lighting panel 20. The button 40 penetrates through the housing 10. The button 40 is configured for allowing a user to press, triggering the control plate 30 to control and switch the plurality of light modes of the lighting panel 20. The waterproof pressing plate 50 is fixedly mounted inside the housing 10 and abuts against the button 40. The waterproof pressing plate is configured to press and restrict the button 40 on the housing 10, so that the button 40 and the housing 10 are sealingly assembled. The support 60 is connected to the housing 10 and configured to carry the housing 10.

When the user uses the illuminating apparatus 100, different lighting modes of the lighting panel 20 can be switched and controlled by pressing the button 40, such that a user's requirement for the different lighting modes of the lighting panel 20 can be met. During this process, the button 40 and the housing 10 are sealingly assembled by the waterproof pressing plate 50, such that the button 40 will not affect a waterproof performance of the overall illuminating apparatus 100, thereby meeting a requirement of outdoor use.

Referring to FIG. 2, the housing 10 includes a lower cover 11 and an upper cover 12. The upper cover 12 is fixedly connected to the lower cover 11. A sealing ring 13 is assembled between the upper cover 12 and the lower cover 11, so as to sealingly assemble the upper cover 12 and the lower cover 11. In some embodiments, the lower cover 11 is rotatably connected to the support 60. The lower cover 11 is in contact with the support 60 in a toothed surface manner, and an adjustable screw 101 penetrating through the lower cover 11 and the support 60 is threadedly connected to a lock nut 102 to realize a lock between the lower cover 11 and the support 60, such that when it is required to adjust a mounting angle between the lower cover 11 and the support 60, it can be realized by screwing or unscrewing the locking nut 102.

Figure 3:
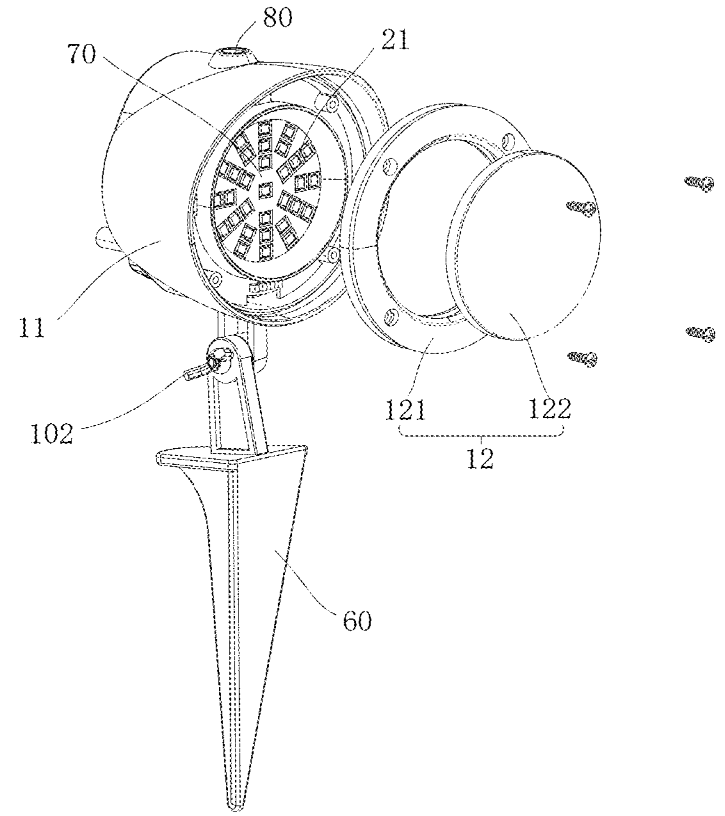
FIG. 3 is an exploded diagram of a part of an illuminating apparatus in an embodiment of the present disclosure.

Referring to FIG. 3, the upper cover 12 includes an upper cover body 121 and a transparent cover 122. The transparent cover 122 is connected to the upper cover body 121 and located on a light output path, such that the lighting panel 20 emits light which passes through the transparent cover 122 when it is operated. In some embodiments, the upper cover body 121 encircles the transparent cover 122.

In some embodiments, the upper cover body 121 and the transparent cover 122 are an integral structure, which is conducive to producing the upper cover body 12 and ensuring a sealing performance between the upper cover body 121 and the transparent cover 122.

Referring to FIG. 3, the lighting panel 20 is electrically connected to a tricolor lamp bead 21, such that the lighting panel 20 can generate any color of light as required. The tricolor lamp bead 21 can generate red light, green light and blue light after the lighting panel 20 is electrified, such that the illuminating apparatus 100 can generate any color of light by mixing the red light, the green light and the blue light when the illuminating apparatus 100 is in operation. In some embodiments, the lighting panel 20 can emit constantly bright white light, green light, red light, blue light as well as flashing white light, green light, red light and blue light. That is, the illuminating apparatus 100 can emit four colors of light, i.e., it has four lighting modes when it is in operation. Alternatively, in other embodiments, the lighting panel 20 can generate light with different colors, which is not detailed described herein.

In some embodiments, referring to FIGS. 2 and 3, the illuminating apparatus 100 further includes a reflector 70. The tricolor lamp bead 21 penetrates through the reflector 70. The reflector 70 is configured to reflect and guide the tricolor lamp bead 21 to generate light to emit outside the housing 10. When the illuminating apparatus 100 is in operation, the illuminating apparatus 100 can guide the tricolor lamp bead 21 to generate the light to emit outside the housing 10 by the reflector 70, such that a light output efficiency of the illuminating apparatus 100 is improved when the illuminating apparatus 100 is in operation.

Referring to FIG. 4, the button 40 is configured as a flexible component. The control plate 30 is electrically connected to the triggering rod 31. The triggering rod 31 penetrates through the waterproof pressing plate 50 and extends into the button 40. The button 40 can trigger the triggering rod 31 after being pressed and deformed, so as to realize a trigger from the button 40 for the control plate 30, and control and switch the plurality of lighting modes of the lighting panel 20. In some embodiments, the flexible component is configured as a silicone or rubber component.

Referring to FIG. 4, the illuminating apparatus 100 further includes a plurality of fixing components 103. The plurality of fixing components 103 can penetrate through the waterproof pressing plate 50 and be threadedly connected to the housing 10, such that the waterproof pressing plate 50 can press a part of the button 40 to be in contact with the housing 10. The plurality of fixing components 103 penetrate through the waterproof pressing plate 50 and then are threadedly connected to the housing 10, which can realize assembling the button 40 and the waterproof pressing plate 50 on the housing 10, facilitating assembling the waterproof pressing plate 50 inside the housing 10. In some embodiments, the fixing component 103 is configured as a bolt, a screw and so on.

Referring to FIG. 4, the waterproof pressing plate 50 is provided with a plurality of connecting lugs 51. The plurality of connecting lugs 51 are disposed on a periphery of the button 40. The housing 10 is provided with a plurality of convex columns 111. The plurality of connecting lugs 51, the plurality of convex columns 111 and the plurality of fixing components 103 correspond to each other one by one. The plurality of fixing component 103 can correspondingly penetrate through the plurality of connecting lugs 111 and be threadedly connected to the plurality of convex columns 111. A connection between the waterproof pressing plate 50 and the housing 10 will not affect the button 40 being pressed and restricted on the housing 10 through the waterproof pressing plate 50, and a sealing performance between the button 40 and the housing 10 can be ensured.

In some embodiments, the number of the fixing components 103 is at least three. Three of at least three fixing components are arranged in a triangle shape, which can improve stability of the waterproof pressing plate 50 mounted on the housing 10, and ensure that the button 40 and the housing 10 are sealingly assembled. In some embodiments, the number of the fixing components 103 is four, and the four fixing components 103 are symmetrically disposed in pairs. The fixing components 103 can be specifically configured as nuts, screws and so on. Alternatively, in other embodiments, the number of the fixing components 103 can be three, five and even more, which is not detailed described herein.

Referring to FIGS. 1 to 4, the illuminating apparatus 100 further includes a light-sensitive module 80. When the light-sensitive module 80 detects that it is at dark, the light-sensitive module 80 can generate feedback signals. The control plate 30 can control the tricolor lamp bead 21 disposed on the lighting panel 20 to emit light according to the feedback signals. The illuminating apparatus 100 can be controlled by the light-sensitive module 80 to emit light and automatically emit light at dark. Working principles of the light-sensitive module 80 detecting the dark and generating the feedback signs and the control plate 30 controlling the tricolor lamp bead 21 disposed on the control plate 20 to emit light according to the feedback signs adopts generally methods, which is not detailed described herein.

In some embodiments, referring to FIGS. 1 to 4, the light-sensitive module 80 can be disposed on a top of the lower cover 11 of the housing 10 and specifically located on a side of the lower cover 11 away from the support 60. By a position of the light-sensitive module 80 disposed on the top of the lower cover 11, the phenomenon of accidental lighting during day because of the light-sensitive module 80 being interfered by plants on the ground can be prevented, avoiding energy waste.

The various technical features of the above embodiments can be combined in any way. In order to make the description concise, not all possible combinations of the various technical features in the above embodiments have been described. However, as long as there is no contradiction in the combination of these technical features, they should be considered within the scope of the specification.

One of ordinary skill in the art should recognize that the above embodiments are used only to illustrate the present disclosure and are not used to limit the present disclosure, and that appropriate variations and improvements to the above embodiments fall within the protection scope of the present disclosure so long as they are made without departing from the substantial spirit of the present disclosure.

What is claimed is:

1. An illuminating apparatus comprising a housing;

a lighting panel fixedly mounted inside the housing, wherein the lighting panel has a plurality of lighting modes, the lighting panel is capable of emitting light in each of the plurality of lighting modes which passes through the housing;

a control plate fixedly mounted inside the housing and electrically connected to the lighting panel;

a button penetrating through the housing, wherein the button is configured for allowing a user to press, triggering the control plate to switch and control the plurality of lighting modes of the lighting panel;

a waterproof pressing plate fixedly mounted inside the housing and abutting against the button, wherein the waterproof pressing plate is configured to press and limit the button on the housing, so that the button and the housing are sealingly assembled; and a support connected to the housing and configured to carry the housing, wherein the illuminating apparatus further comprises a plurality of fixing components, wherein the plurality of fixing components are capable of penetrating through the waterproof pressing plate and being threadedly connected to the housing, the waterproof pressing plate is provided with a plurality of connecting lugs, the housing is provided a plurality of convex columns, the plurality of connecting lugs, the plurality of convex columns and the plurality of fixing components correspond to each other one by one.

2. The illuminating apparatus of claim 1, wherein the button is configured as a flexibly component; and wherein the control plate is electrically connected to a triggering rod, the triggering rod penetrates through the waterproof pressing plate and extends into the button, and the button is capable of triggering the triggering rod after being pressed and deformed.

3. The illuminating apparatus of claim 1, wherein the plurality of fixing components are capable of correspondingly penetrating through the plurality of connecting lugs and being threadedly connected to the plurality of convex columns; and wherein the plurality of connecting lugs are disposed on a periphery of the button.

4. The illuminating apparatus of claim 1, wherein the number of fixing components is at least three, and three of at least three fixing components are arranged in a triangle shape.

5. The illuminating apparatus of claim 1, wherein a tricolor lamp bead is electrically connected to the lighting panel.

6. The illuminating apparatus of claim 5, further comprising a reflector, wherein the tricolor lamp bead penetrates through the reflector, and the reflector is configured to reflect and guide light emitted from the tricolor lamp bead outside the housing.

7. The illuminating apparatus of claim 1, wherein the housing comprises a lower cover and an upper cover, the upper cover is fixedly connected to the lower cover, and a sealing ring is assembled between the upper cover and the lower cover; and wherein the lower cover is connected to the support.

8. The illuminating apparatus of claim 7, wherein the upper cover comprises a upper cover body and a transparent cover, the transparent cover is connected to the upper cover body and located on a light output path; and wherein the upper cover body encircles the transparent cover.

9. The illuminating apparatus of claim 8, wherein the upper cover body and the transparent cover are an integral structure.

* * * * *